US009951877B2

(12) United States Patent
Grace et al.

(10) Patent No.: US 9,951,877 B2
(45) Date of Patent: Apr. 24, 2018

(54) MULTI-STAGE TRIM

(71) Applicant: Cameron International Corporation, Houston, TX (US)

(72) Inventors: Andrew Grace, Shannon (IE); Martin O'Donnell, Kilcar (IE)

(73) Assignee: Cameron International Corporation, Houston, TX (US)

( * ) Notice: Subject to any disclaimer, the term of this patent is extended or adjusted under 35 U.S.C. 154(b) by 119 days.

(21) Appl. No.: 14/502,606

(22) Filed: Sep. 30, 2014

(65) Prior Publication Data

US 2015/0013797 A1 Jan. 15, 2015

Related U.S. Application Data

(63) Continuation of application No. 12/669,039, filed as application No. PCT/IB2008/053368 on Aug. 21, 2008, now Pat. No. 8,863,776.

(60) Provisional application No. 60/969,398, filed on Aug. 31, 2007.

(51) Int. Cl.
*F16K 47/08* (2006.01)
*F16K 3/24* (2006.01)
*F16K 47/04* (2006.01)

(52) U.S. Cl.
CPC ............... *F16K 3/24* (2013.01); *F16K 47/04* (2013.01); *F16K 47/08* (2013.01); *Y10T 137/86734* (2015.04); *Y10T 137/86759* (2015.04); *Y10T 137/87265* (2015.04); *Y10T 137/87917* (2015.04)

(58) Field of Classification Search
USPC ............ 137/625.3, 625.33, 625.37; 251/127; 138/40, 42
See application file for complete search history.

(56) References Cited

U.S. PATENT DOCUMENTS

| 3,513,864 A | 5/1970 | Self |
| 3,514,074 A | 5/1970 | Self |
| 3,780,767 A | 12/1973 | Borg et al. |
| 3,813,079 A | 5/1974 | Baumann et al. |
| 3,941,350 A | 3/1976 | Kluczynski |
| 4,037,615 A | 7/1977 | Gongwer |
| 4,068,683 A | 1/1978 | Self |
| 4,105,048 A | 8/1978 | Self |

(Continued)

OTHER PUBLICATIONS

PCT International Search Report and Written Opinion for PCT/IB2008/053368, dated Jan. 12, 2009.

*Primary Examiner* — John Fox
(74) *Attorney, Agent, or Firm* — Fletcher Yoder, P.C.

(57) ABSTRACT

A system including a valve trim having a plurality of flow paths, wherein each flow path of the plurality of flow paths includes a series of stages, and a plurality of expansion zones disposed in series with the series or stages, wherein each expansion zone of the plurality of expansion zones is disposed between a sequential set of adjacent upstream and downstream stages of the series of stages, wherein each expansion zone of the plurality of expansion zones is configured to flow a fluid in a direction that is generally transverse to directions of flow in both the adjacent-upstream stage and the adjacent-downstream stage, and wherein each expansion zone of the plurality of expansion zones is in line with one of the adjacent-upstream stage or the adjacent-downstream stage and offset from a different one of the corresponding adjacent-upstream stage or the adjacent-downstream stage.

23 Claims, 5 Drawing Sheets

(56) References Cited

U.S. PATENT DOCUMENTS

| | | |
|---|---|---|
| 4,108,210 A | 8/1978 | Luthe et al. |
| 4,127,146 A | 11/1978 | Self |
| 4,267,045 A | 5/1981 | Hoof |
| 4,326,554 A | 4/1982 | Gongwer |
| 4,327,757 A | 5/1982 | Weevers |
| 4,384,592 A | 5/1983 | Ng |
| 4,567,915 A | 2/1986 | Bates et al. |
| 4,679,592 A | 7/1987 | Lamb |
| 4,938,450 A | 7/1990 | Tripp et al. |
| 5,390,896 A | 2/1995 | Smirl |
| 5,687,763 A | 11/1997 | Steinke |
| 5,732,738 A | 5/1998 | Graham |
| 5,803,119 A | 9/1998 | Steinke |
| 5,819,803 A | 10/1998 | Lebo et al. |
| 5,941,281 A | 8/1999 | Baumann et al. |
| 6,161,584 A | 12/2000 | Hemme et al. |
| 6,615,874 B2 | 9/2003 | Thurston et al. |
| 7,178,782 B1 | 2/2007 | York |
| 7,766,045 B2 | 8/2010 | Fagerlund et al. |
| 2003/0136454 A1 | 7/2003 | Thurston |
| 2007/0028977 A1 | 2/2007 | Goulet |

MULTI-STAGE TRIM

CROSS REFERENCE TO RELATED APPLICATIONS

This application claims priority to U.S. patent application Ser. No. 12/669,039, entitled "Multi-Stage Trim", filed on Jan. 13, 2010, which is herein incorporated by reference, which claims priority to PCT Patent Application No. PCT/IB08/53368, entitled "Multi-Stage Trim", filed on Aug. 21, 2008, which is herein incorporated by reference, which claims priority to U.S. Provisional Patent Application No. 60/969,398, entitled "Multi-Stage Trim", filed on Aug. 31, 2007, which is herein incorporated by reference.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In a variety of systems, it is often useful to lower the pressure of a fluid. For example, pressure drops often occur during acquisition and processing of natural gas. At various stages of gas production, the natural gas may achieve pressures that impede subsequent processing of the gas, thus it is desirable to flow the natural gas from a high-pressure region to a low-pressure region, dropping the gas pressure in transit.

Rapid drops in pressure, however, often cause a variety of problems. Flow across a large pressure gradient accelerates the fluid to a high velocity, and the transition can cause damaging vibrations. In some instances, the high-velocity fluid establishes a shockwave, or thin fluid layer in which a large energy transformation occurs. The shockwaves emit noise, generate heat, and erode equipment. Thus, designers of fluid-handling systems strive to reduce fluid pressure gradually, so they avoid, or at least mitigate, shockwaves and vibrations.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
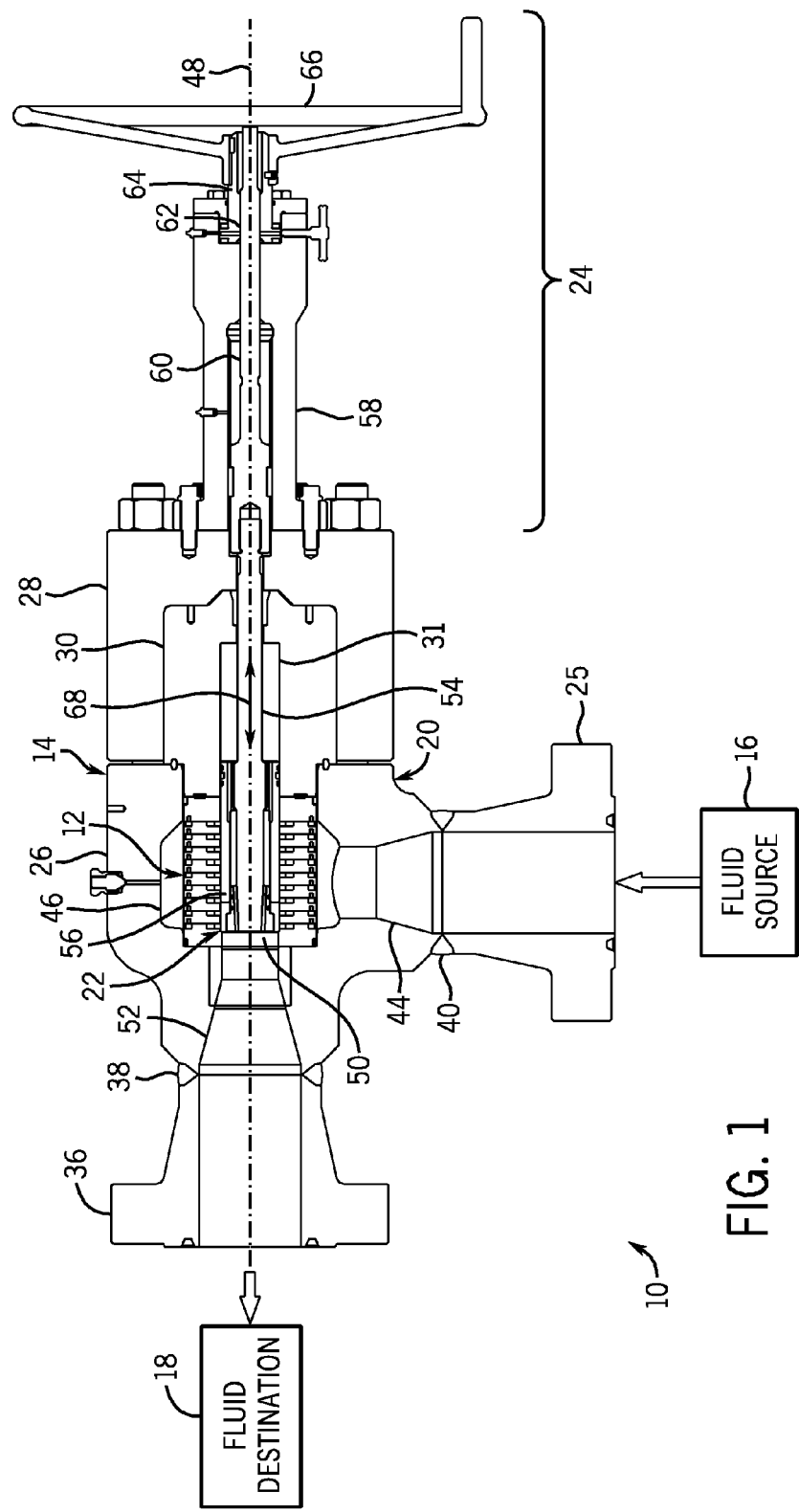
FIG. 1 is a cross-section of an embodiment of a fluid-handling system with a trim.

FIG. 1 illustrates an example of a fluid-handling system 10 having a trim 12 that, in certain embodiments, addresses the above-mentioned problems. The trim 12, as explained below, includes a plurality of flow paths that gradually lower the pressure of a fluid flowing through the trim 12. The flow paths include a series of stages, or constricted passages, and each stage lowers the fluid pressure by an amount that is substantially smaller than the total pressure drop across the trim 12. Incrementally reducing the pressure is believed to prevent, or at least mitigate, shockwaves and vibrations, because the smaller, incremental pressure drops between stages do not accelerate the fluid as much as a single, large pressure drop across a single-stage flow path.

Additionally, certain embodiments of the trim 12 are smaller, less expensive, and easier to manufacture than conventional designs, because embodiments of the trim 12 have relatively few stages and a relatively simple geometry for a given overall pressure drop and a given amount of acceptable erosion. The stages are sized based on the flow efficiency of the fluid passing through each stage, so the flow path expands more aggressively and through fewer stages to the final stage size without any one stage conducting fluid at too high a velocity. Because there are fewer stages, the flow path is simpler, shorter, and less expensive to manufacture. Additionally, the shorter flow path fits within smaller trims, thereby reducing material costs. Examples of the trim 12 are described below, after describing some of the other components of the fluid-handling system 10.

The illustrated fluid-handling system 10 includes a choke valve 14, a fluid source 16, and a fluid destination 18. The fluid source 16 and/or the fluid destination 18 may be an offshore or onshore well, a pipeline, a refinery, a storage facility, a pressure vessel, a compressor, a tanker, a liquefied-natural-gas terminal, or other source or destination of a pressurized fluid. In this embodiment, the fluid source 16 is at a higher pressure than the fluid destination 18. The pressure difference may be greater than 1,000 psi, 5,000 psi, or 10,000 psi, depending on the application, and the fluid from the source 16 may be air, steam, natural gas, water, oil, or other fluids.

In this embodiment, the choke valve 14 includes a housing 20, the trim 12, a valve member 22, and an actuator 24. These components and their functions are described below.

The illustrated housing 20 includes an upstream flange 25, a forward housing 26, a rear housing 28, a backing member 30, and a downstream flange 36. The components of the housing 20 may be made of steel or other materials. The illustrated flanges 25 and 36 are secured to the forward housing 26 by welds 38 and 40. The backing member 30 is disposed inside both the forward housing 26 and the rear housing 28, and member 30 is in contact with the trim 12 or an intermediary member. The backing member 30 includes a chamber 31 that is generally complementary to the valve member 22. Bolts 42 bias the rear housing 28 against the forward housing 26.

The forward housing 26 includes several features that, in the aggregate, define a flow path. At an upstream portion of the flow path, a contracting nozzle 44 meets the flange 25 and leads to an upstream manifold 46. The upstream manifold 26, in this embodiment, surrounds the trim 12 and defines a generally annular volume. The illustrated upstream manifold 46 is generally concentric about a central axis 48 that extends through the choke valve 14. Downstream from the manifold 46, the flow path continues through the trim 12, dividing among a plurality of trim flow paths that are described below with reference to FIGS. 2 and 3. The trim flow paths collect in a downstream manifold 50 that is defined by the interior of the trim 12. In this embodiment, the downstream manifold 50 is a generally right, circular-cylindrical volume that is generally concentric about the central axis 48. Downstream from the manifold 50, the flow path continues into an expanding nozzle 52 that feeds into the flange 36.

The valve member 22 of FIG. 1 includes a shaft 54 and a sealing member 56. The shaft 54 extends through, and is either permanently coupled or removeably coupled to, the sealing member 56. The sealing member 56 has a generally right, circular-cylindrical shape that is complementary to the downstream manifold 50, and the sealing member 56 forms a sealing surface with the interior of the trim 12. The sealing member 56 may be made of an abrasion-resistant material, and the shaft 54 may be made of steel or other materials. The shaft 54 and the sealing member 56 are generally concentric about the central axis 48.

The illustrated actuator 24 is a manual actuator that includes a spacer 58, an actuator shaft 60, a threaded portion 62, a nut 64, and a wheel 66. In this embodiment, the actuator shaft 60 is coupled at one end to the shaft 54. At the other end of the actuator shaft 60, the threaded portion 62 engages complementary threads in the nut 64 to form a threaded connection. The illustrated nut 64 is held in fixed relation to the wheel 66, and the wheel 66 is rotationally coupled to the spacer 58. The spacer 58, the shaft 60, the nut 64, and the wheel 66 are generally concentric about the central axis 48.

In operation, an operator adjusts the flow through the choke valve 14 by rotating the wheel 66. As the wheel 66 rotates, it spins the nut 64 around the threaded portion 62, while the actuator shaft 60 is prevented from rotating. The threaded coupling between the nut 64 and threaded portion 62 converts the rotation of the wheel 66 into a linear translation 68 of both the actuator shaft 60 and the valve member 22. In this embodiment, the valve member 22 may be described as having a single degree of freedom.

Translation 68 of the valve member 22 changes the flow rate through the choke valve 14. If the wheel 66 is rotated in a first direction, the sealing member 56 is pulled into the backing member 30, and the size of the downstream manifold 50 increases. A more-recessed sealing member 56 obstructs fewer flow paths through the trim 12, thereby increasing the flow rate. Conversely, if the wheel 66 is rotated in a second, opposite direction, the sealing member 56 pushes into the downstream manifold 50, and more flow paths through the trim 12 are obstructed by the sealing member 56, thereby decreasing the flow rate through the choke valve 14. Thus, rotation of the wheel 66 modulates the flow rate through the choke valve 14.

Other embodiments may have features different from those illustrated by FIG. 1. For instance, other embodiments may include other types of actuators. The sealing member 56 may be adjusted by a hydraulic drive, a piston, an electric motor, a linear motor, or some other device configured to move the sealing member within the trim 12. In some embodiments, the sealing member 56 may be disposed in the upstream manifold 46, and the sealing member 56 may have a generally tubular shape configured to slide over the trim 12. The illustrated choke valve 14 is a 90-degree angled valve, because the valve outputs fluid flowing in a direction that is 90 degrees different from the direction in which the fluid is flowing when received, but other embodiments may include an inline valve that outputs fluid flowing in the same direction as the direction in which fluid is flowing when received. It should also be noted that, in some applications, the fluid handling system 10 may not include a valve member 22. In these systems, the trim 12 still drops the pressure of a fluid flowing from the fluids source 16 to the fluid destination 18, but the flow rate is not necessarily modulated by moving a valve member along the trim 12.

Figure 2:
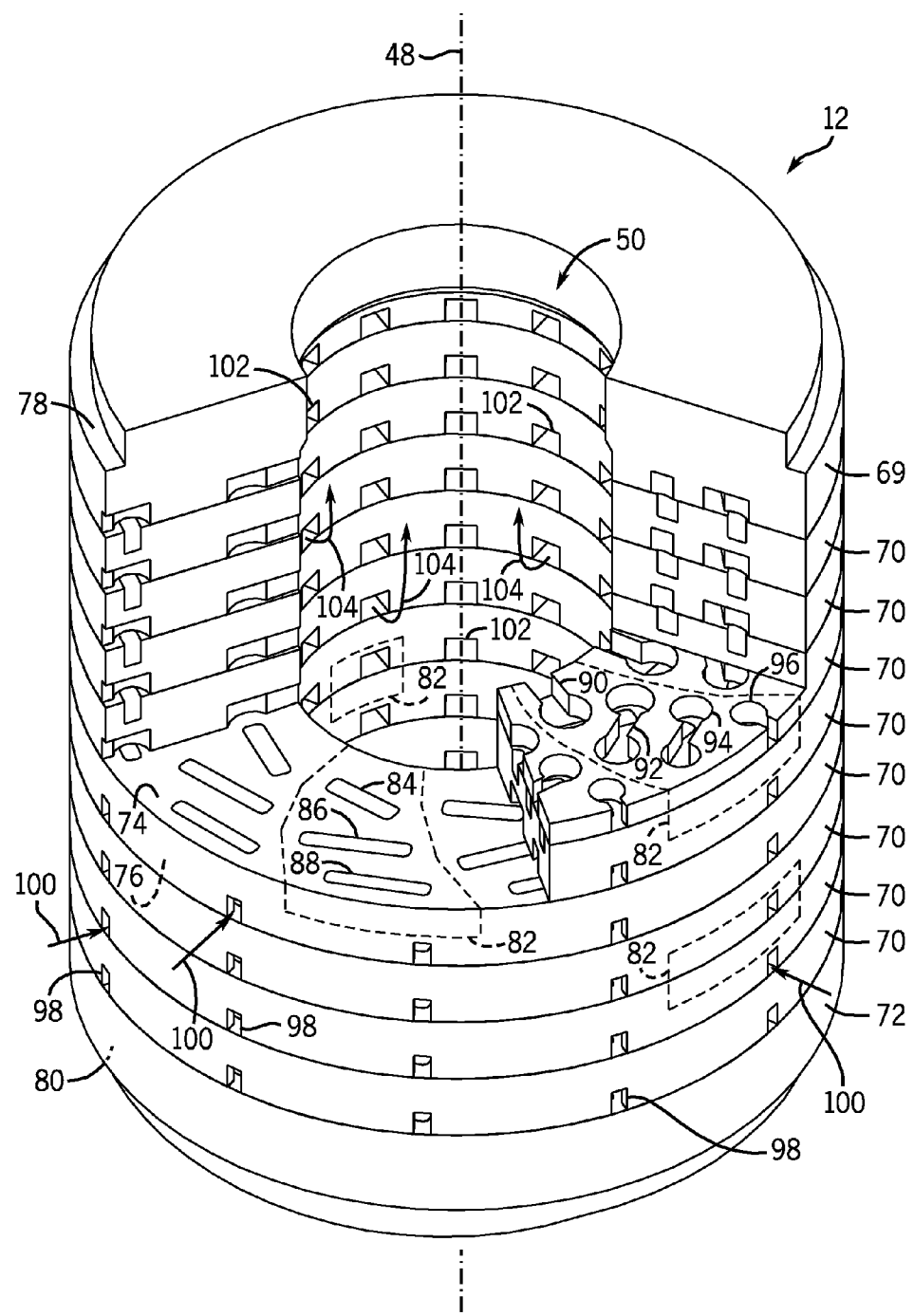
FIG. 2 is a partial-cross-section of the trim.

FIG. 2 depicts the trim 12. The term trim refers to a member configured to remove kinetic energy from a fluid. In this embodiment, the trim 12 includes a top plate 69, eight-intermediate plates 70, and a bottom plate 72. The top plate 69 and the bottom plate 72 include ledges 78 and 80, respectively. The plates 69, 70, and 72 have a generally annular shape that is generally concentric about the central axis 48. A top face 74 of each plate is generally parallel to a bottom face 76 of each plate, and both faces 74 and 76 have a normal vector that is generally parallel to the central axis 48. The plates 69, 70, and 72 may be machined or otherwise formed from tungsten carbide, stainless steel, or other suitable materials.

The plates 69, 70, and 72 may be either permanently or removeably coupled to one another. Permanently coupling the plates 69, 70, and 72 is believed to increase the strength of the trim 12, and removeably coupling the plates 69, 70, and 72 is believed to facilitate removal of debris that becomes trapped within the trim 12 during operation. In some embodiments, the trim 12 may be shrouded with a metal shield to protect the trim 12 from debris carried by the fluid.

The plates 69, 70, and 72 include repeating collections of features referred to as flow-path units 82. In this embodiment, the flow-path units 82 are repeated around the central axis 48 in a generally rotationally-symmetric pattern, and each flow-path unit 82 includes features of adjacent plates 69, 70, or 72. That is, both features on the bottom of a given plate 70 and features on the top of an adjacent plate 70 are included in a given flow-path unit 82, so the flow-units 82 are formed by stacking the plates 69, 70, and 72. Each of the illustrated flow-path units 82 is generally identical to the other flow-path units 82, but in other embodiments this may not be the case. For instance, features of the flow-path units 82, such as size, may vary along the central axis 48.

Within each flow-path unit 82, there are a plurality of cavities 84, 86, 88, 90, 92, 94, and 96. As explained below, these cavities 84, 86, 88, 90, 92, 94, and 96 combine to define a flow path that is described below with reference to FIG. 3. The cavities 84, 86, and 88 extend inward from the top face 74 of each plate, in a direction that is generally parallel to the central axis 48, and the cavities 90, 92, 94, and 96 extend upward from the bottom face 76, in a direction that is also generally parallel to the central axis 48.

When the illustrated trim 12 is assembled, the cavities 84, 86, and 88 in the top face 74 of a given plate 70 are not in fluid communication with the cavities 90, 92, 94, and 96 in the bottom face 76 of the same plate 70. That is, in this embodiment, the flow does not cross entirely through any of the plates 69, 70, or 72 in an axial direction (i.e., a direction parallel to central axis 48), but rather the flow crosses back and forth between adjacent plates 70 in the manner described below with reference to FIG. 3. In other embodiments, however, the flow may cross entirely through one or more plates 70 in an axial direction.

Figure 3:
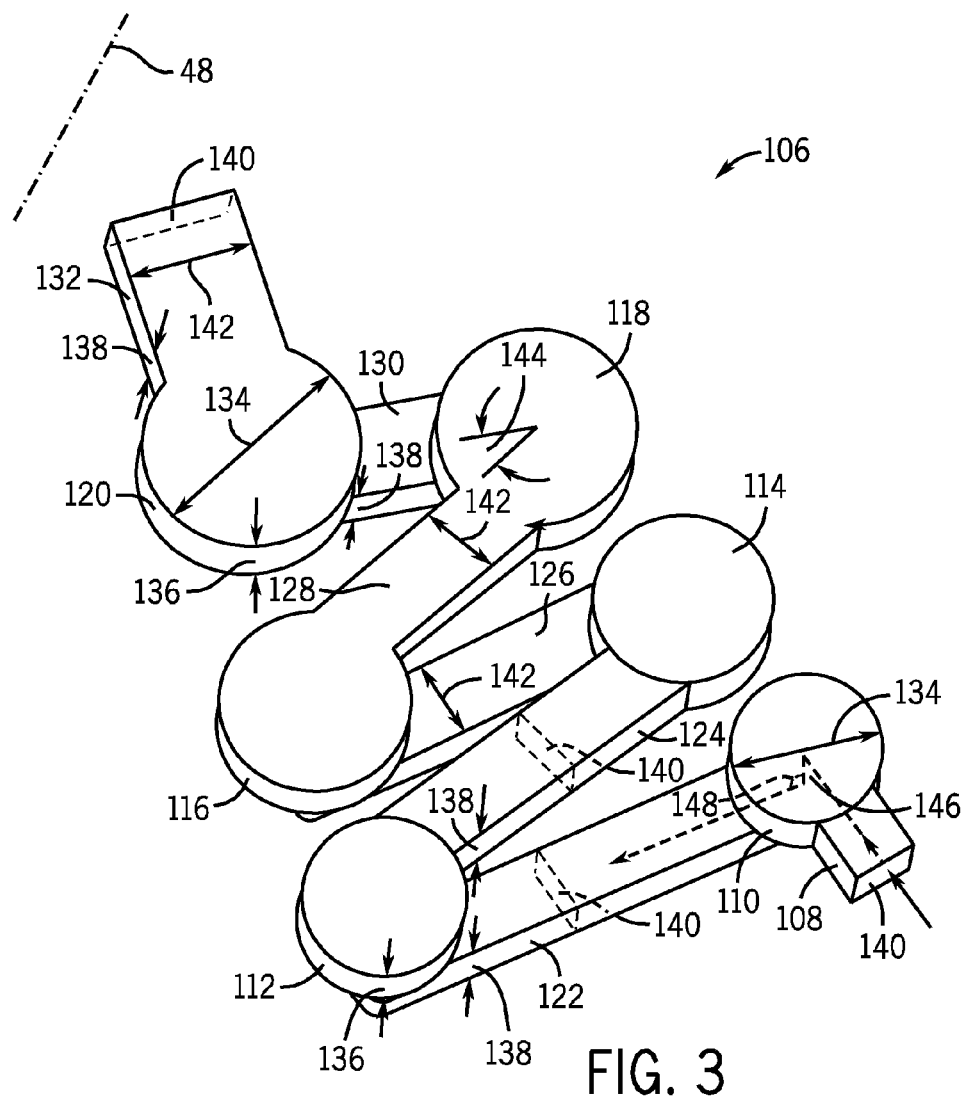
FIG. 3 is a perspective view of a flow path through the trim.

Each of the flow-path units 82 includes an inlet 98 that receives an inflow 100 and an outlet 102 that emits an outflow 104, wherein each flow-path unit 82 defines a flow path 106 generally extending in a direction (e.g., radial inward direction) from the inlet 98 to the outlet 102, and each flow-path unit 82 has cavities (e.g., alternating stages and expansion zones) arranged in alternating opposite lateral directions and offsets relative to the direction from the inlet 98 to the outlet 102 (see detailed arrangement of FIG. 3). As explained below, in this embodiment, each inlet 98 is in fluid communication with one and only one outlet 102, but in other embodiments, one inlet 98 may be in fluid communication with multiple outlet 102 or vice versa.

Each of the intermediate plates 70 is generally identical, but in other embodiments, different plates may cooperate to form the flow-path units 82. For example, The flow-path units 82 may be formed by stacking four plates: a lower, blank plate with no cavities; a plate with apertures in the shape of cavities 84, 86, and 88 extending entirely through the plate; a plate with apertures in the shape of cavities 90, 92, 94, and 96 extending entirely through the plate; and an upper, blank plate.

As mentioned above, the cavities 84, 86, 88, 90, 92, 94, and 96 cooperate to define a flow path 106 illustrated by FIG. 3. The present flow path 106 includes an inlet stage 108, six expansion zones 110, 112, 114, 116, 118, and 120, five intermediate stages 122, 124, 126, 128, and 130, and an outlet stage 132. These features of the flow path 106 are defined by the cavities 84, 86, 88, 90, 92, 94, and 96 illustrated in FIG. 2. Specifically, the inlet stage 108 and the expansion zone 110 are defined by the cavity 96; the intermediate stage 122 is defined by a cavity 88; the expansion zones 112 and 114 and the intermediate stage 124 are defined by the cavity 94; the intermediate stage 126 is defined by the cavity 86; the expansion zones 116 and 118 and the intermediate stage 128 are defined by the cavity 92; and the intermediate stage 130 is defined by the cavity 84; and the expansion zone 120 and outlet stage 132 are defined by the cavity 90. Thus, the flow path 106 is formed in both the top of one plate 69 or 70 and the bottom of an adjacent plate 70 or 72. As illustrated in FIG. 3, the flow path 106 extends in a direction (e.g., radial inward direction) from the inlet 98 (e.g., inlet stage 108) to the outlet 102 (e.g., outlet stage 132), wherein the flow path 106 has the stages (e.g., 122, 124, 126, 128, and 130) arranged in alternating opposite lateral directions (e.g., longitudinal axes of the stages) relative to the direction from the inlet 98 (e.g., inlet stage 108) to the outlet 102 (e.g., outlet stage 132). In addition, the flow path 106 has the expansion zones (e.g., 110, 112, 114, 116, 118, and 120) arranged in alternating opposite lateral offsets relative to the direction from the inlet 98 (e.g., inlet stage 108) to the outlet 102 (e.g., outlet stage 132). As illustrated in FIGS. 2 and 3, the flow path 106 is disposed in the trim 12 having an annular shape (e.g., annular trim) about the central axis 48, and thus the alternating opposite lateral directions are alternating clockwise and counter-clockwise directions about the central axis 48, and the alternating opposite lateral offsets are alternating clockwise and counterclockwise offsets.

Each of the illustrated expansion zones 110, 112, 114, 116, 118, and 120 has a generally right, circular-cylindrical shape with a generatrix that is generally parallel to the central axis 48. (The term "generatrix" refers to a straight line that generates a surface by moving along a specified path, e.g., a generatrix moved along a circular path forms a circular cylinder, and if the generatrix is normal to the plane in which the circle lies, it forms a right-circular cylinder.) Further, each expansion zone 110, 112, 114, 116, 118, and 120 may be characterized, in part, by a diameter 134. The diameters 134 of the expansion zones 110, 112, 114, 116, 118, and 120 progressively increase along the flow path 106, with the diameter 134 of the expansion zone 120 being the largest, and the diameter 134 of the expansion zone 110 being the smallest. In some embodiments, the corners of some or all of the expansion zones 110, 112, 114, 116, 118, and 120 may have a chamfer or a fillet, depending on whether the corner is an interior corner or an exterior corner. A height 136 of the expansion zones 110, 112, 114, 116, 118, and 120 may be generally uniform among these features and generally equal to a height 138 of each of the stages 108, 122, 124, 126, 128, 130, 132. Other embodiments, however, are not limited to these dimensional relationships. For example, the heights 136 and 138 may progressively increase along the flow path 106.

Each of the stages 108, 122, 124, 126, 128, 130, and 132, in this embodiment, has a generally cuboid shape, which defines a generally rectangular cross-section 140. The area of the cross-section 140 is generally equal to the product of the stage height 138 and a stage width 142. The stage height 138 and stage width 142 are both measured in directions that are perpendicular to the average direction of flow through the cross-section 140. The sides of the stages 108, 122, 124, 126, 128, 130, and 132 are either generally perpendicular or generally parallel to the central axis 48, and the corners may include a fillet. In other embodiments, one or more of the stages 108, 122, 124, 126, 128, 130, and 132 may have a different, non-cuboid shape, such as a cylindrical shape.

In this embodiment, the inlet stage 108, intermediate stages 124 and 128, and outlet stage 132 are at generally the same axial position (as measured along the central axis 48) as the expansion zones 110, 112, 114, 116, 118, and 120, and the intermediate stages 122, 126, and 130 generally lie at an adjacent axial position. Adjacent intermediate stages 122, 124, 126, 128, and 130 define angles 144, and in some embodiments, these angles 144 are acute, e.g., between 5 and 85 degrees.

As previously noted, in this embodiment, the stage heights 138 are generally uniform among all of the stages 108, 122, 124, 126, 128, 130, and 132. The stage widths 142, however, increase progressively along the flow path 106, with the outlet stage 132 having the largest width 142, and the inlet stage having the smallest width 142. A corollary to this is that the cross-sectional areas 140 also progressively increase along the flow path 106, with the inlet stage 108 having the smallest cross-sectional area 140, and the outlet stage 132 having the largest cross-sectional area 140.

In some embodiments, the cross-sectional area 140 of each stage may be larger than the cross-sectional area 104 of the adjacent, upstream stage by an amount that is based on the flow efficiency through various portions of the flow path 106. The flow efficiency is defined as the flow rate through a structure divided by the pressure drop across the structure, and the flow efficiency of stages that either upstream or downstream of a given stage affect the pressure drop, and consequently the velocity, of the fluid flowing through the given stage. Flow efficiency and velocity of each stage may be determined with a valve-designing process described below with reference to FIGS. 4 and 5. In some embodiments, the ratio of cross-sectional areas 140 of adjacent stages may increase along the flow path 106, with the ratio of the cross-sectional area 140 of stage 124 to the cross-sectional area 140 of stage 108 being the smallest, and the ratio of the cross-sectional area 140 of stage 132 to the cross-sectional area 140 of stage 130 being the largest. That is, the cross-sectional areas 140 may increase along the flow path 106 by a non-constant, increasing ratio.

The increase in consecutive feature sizes may be referred to as an expansion ratio. The expansion ratio for a given stage is calculated by dividing its cross-sectional area 140 by the cross-sectional area 140 of the adjacent upstream stage. Thus, in some embodiments, the expansion ratio of each stage 122, 124, 126, 128, 130, and 132 may progressively increase along the flow path, with the outlet stage 132 having the largest expansion ratio.

In operation, flow path 106 lowers the pressure of a fluid. As the fluid flows through each stage 108, 122, 124, 126, 128, 130, 132, the pressure of the fluid may drop and the volume and/or velocity of the fluid may increase relative to the previous stage, because as mentioned above, the cross-sectional area 140 of each stage is larger than the cross-sectional areas 140 of the upstream stages.

Between stages, the fluid enters the expansion zones 110, 112, 114, 116, 118, 120. The expansion zones 110, 112, 114, 116, 118, 120 are believed to facilitate static pressure recovery, or the deceleration of a fluid to increase static pressure. In the expansion zones 110, 112, 114, 116, 118, and 120, the aggregate flow undergoes two-90 degree bends 146 and the 148. The first bend 146 is produced by the fluid turning in the expansion zone and flowing downward, in the direction of the central axis 48, and the second bend 148 is from the fluid turning again and entering the next stage 122 to flow in a direction generally perpendicular to the central axis 48. The sequence and orientation of the bends 146 and 148 depends on the expansion zone: in the expansion zones 110, 114, and 118, the fluid initially turns 90 degrees in a downward-axial direction before turning 90 degrees in a radial—or perpendicular to axial—direction; and in the expansion zones 112, 116, and 120, the fluid initially turns 90 degrees in an upward-axial direction before turning 90 degrees in a radial direction. Thus, in this embodiment, the fluid flows both axially and radially, and each turn removes energy from the fluid.

The diameters 134 and widths 142 increase along the flow path 106 by amounts that depend both on parameters of the particular application—such as the type of fluid, the flow rate, and the overall pressure drop across the flow path 106—and the flow efficiency of the fluid flowing through the flow path 106. By sizing the diameters 134 and widths 142 based on the flow efficiency, the flow path 106 can be expanded over relatively few stages without giving rise to excessive vibrations or shockwaves. The amount of vibrations or shock wave intensity that are excessive will depend on parameters of the particular application, such as the desired life of the trim, the acceptable rate of trim material erosion, and the proximity of other equipment that is sensitive to vibrations. A valve-designing process that accounts for flow efficiency is described below with reference to FIGS. 3, 4 and 5.

Sizing the diameters 134 and widths 142 according to flow efficiency is believed to offer certain advantages. The illustrated flow path 106 exhibits relatively uniform pressure-drop ratios across each of the stages 108, 122, 124, 126, 128, 130, and 132. The pressure-drop ratio for a given stage is calculated by taking the difference between the pressure of an adjacent, upstream stage and the pressure of an adjacent, downstream stage, and dividing the difference by the overall pressure drop across the flow path 106. The uniformity of the pressure-drop ratios may be characterized by a percent, pressure-drop-ratio variation, which is defined as 100 times the standard deviation of the pressure-drop ratios for each of the stages divided by the average pressure-drop ratio for all of the stages. A low percent, pressure-drop-ratio variation indicates that the overall pressure drop across the flow path 106 is evenly divided among the stages 108, 122, 124, 126, 128, 130, 132. For example, certain embodiment with seven stages may exhibit an average pressure-drop ratio near 0.3, a standard deviation of pressure-drop ratio of 0.03, and a percent, pressure-drop-ratio variation of 9.3%. Some embodiments may be characterized as having percent, pressure-drop-ratio variations less than 12%, 11%, 10%, or 9.5%.

Evenly allocating the overall pressure drop across the stages is believed to allow designers to simplify and shorten the flow path 106 without giving rise to excessive vibrations or shockwaves. As described in the background, damaging vibrations and shockwaves are caused by pressure gradients that are too large. Thus, the stage with the largest pressure-drop ratio, in part, determines how few stages the flow path can have without fluid flow generating vibrations and shockwaves. In the illustrated embodiment, none of these stages has a substantially larger pressure-drop ratio than the others, so none of the stages acts as a weak point. This means that fewer stages can perform a larger overall pressure drop without giving rise to excessive vibrations or shockwaves. Because it has relatively few stages for the size of the overall pressure drop it performs, the flow path 106 is relatively short, and because it is relatively short, the trim 12 consumes less material and costs less. Further, each stage adds to the cost of machining the trim, so for this reason also, the trim 12 is believed to be less expensive to manufacture. Finally, the trim 12 is believed to be less expensive to maintain, because the flow path 106 has relatively few stages in which debris in the fluid might become trapped.

In other embodiments, the flow path 106 may have a different shape from the shape illustrated by FIG. 3. For example, other embodiments may include more or fewer stages, depending on the fluid and the overall pressure drop. Generally, though, the larger the overall pressure drop, the more stages an embodiment will include.

Figure 4:
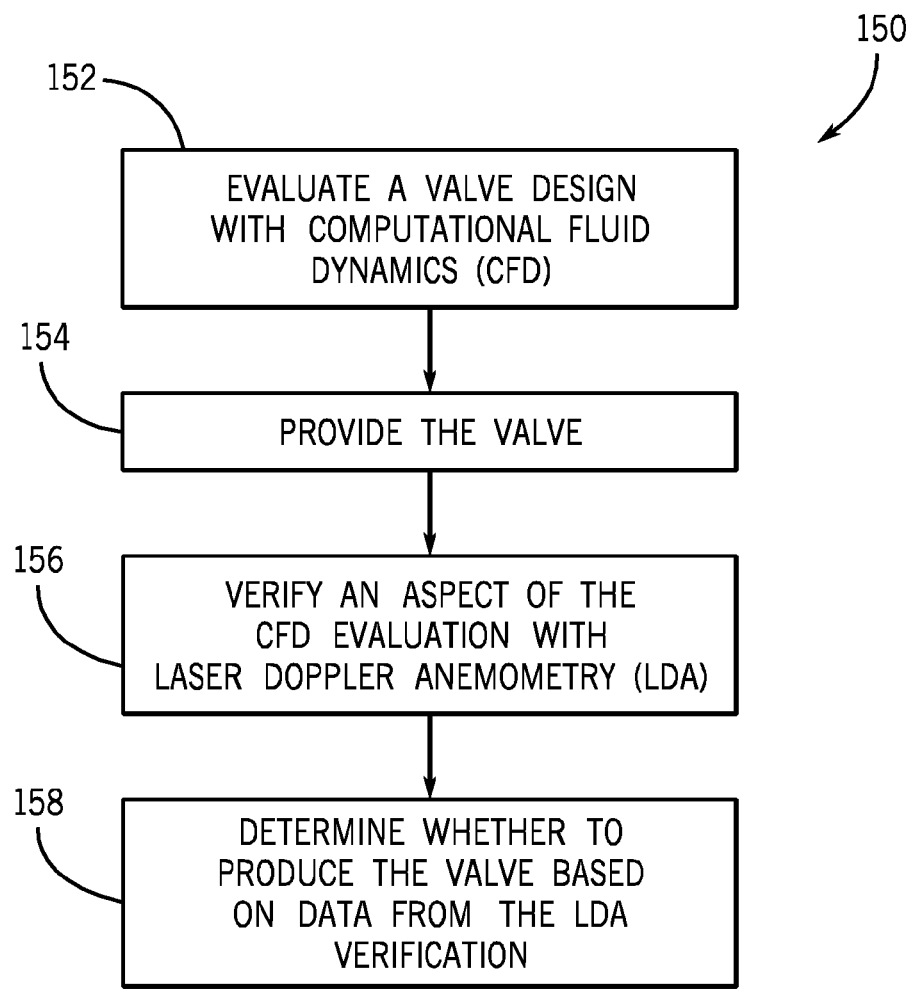
FIG. 4 is a flow chart of an embodiment of a valve-designing process using laser-doppler-anemometry (LDA)

FIG. 4 illustrates a valve-designing process 150. The illustrated process 150 begins with evaluating a valve design with computational fluid dynamics (CFD). Evaluating a valve design may include modeling a valve with computer aided design (CAD) software and testing the model with CFD software. The design may be evaluated according to various criteria, such as the maximum fluid velocity, the flow efficiency, and vector streamlines. In some embodiments, a plurality of valve designs may be evaluated, and the valve design with the best performance, e.g., the lowest maximum velocity, is selected.

Next, the selected valve is provided, as illustrated by block 154. In some embodiments, only a portion of the valve is provided for testing, for example, a flow path through a valve trim. The valve or the portion of the valve is, in some embodiments, provided by machining the flow path in a material that facilitates testing, for example, a generally translucent material such as glass, Lucite, or Lexan.

After providing the valve, an aspect of the CFD evaluation may be verified with laser Doppler anemometry (LDA), as illustrated by block 156. An example of an LDA test bench is described below with reference to FIG. 5. During this step, an operator flows a test fluid through the valve or portion of the valve that was provided in the previous step, and the LDA test bench measures the aspect of the CFD evaluation. For instance, the LDA test bench may measure a test-fluid pressure or a test-fluid velocity.

Based on the data from the LDA verification, it is determined whether to produce the valve, as illustrated by block 158. Determining whether to produce the valve may include determining whether the LDA results match or corresponds with the CFD predictions. If the valve is produced, a plurality of instances of the valve are manufactured and installed in fluid-handling systems.

Figure 5:
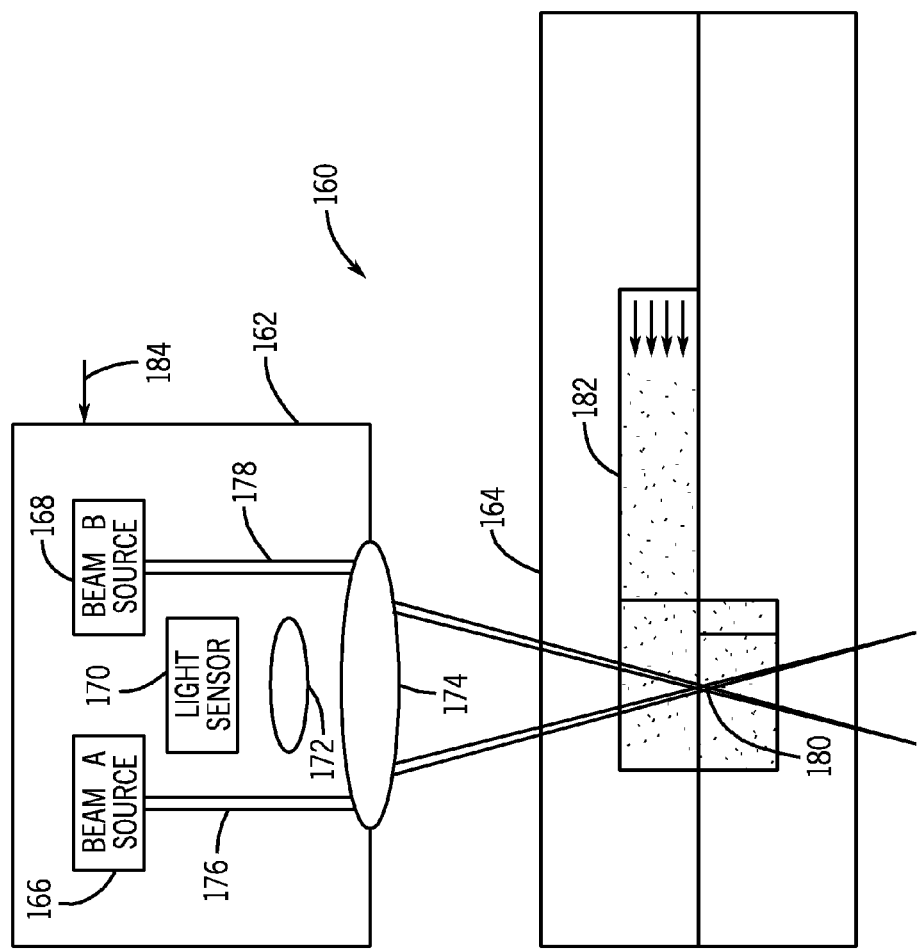
FIG. 5 is a diagram of an embodiment of a LDA test bench evaluating the flow path.

FIG. 5 illustrates an example of a LDA test bench 160. In this embodiment, the LDA test bench 160 includes a sensor head 162 and a sample-flow-path unit 164. The sensor head 162 includes two beam sources 166 and 168, a light sensor 170, and two lenses 172 and 174. Each beam source 166 and 168 emits a laser beam 176 and 178, respectively. These beams 176 and 178 are focused by the lens 172 on a measurement volume 180 inside the sample-flow-path unit 164. The sample-flow-path unit 164, in this embodiment, is made from a translucent material, such as those discussed above, and includes a flow path 182 conducting a test fluid. The test fluid is air laden with oil or smoke particles.

In operation, the particles and the test fluid flow through the measurement volume 180, and the illuminated particles reflect light that indicates the velocity of the particles. The effect of the particles is sensed by the light sensor 170, which is configured to calculate a fluid velocity within the measurement volume 180.

In this embodiment, as indicated by arrow 184, the sensor head 162 is configured to raster the measurement volume 180 through substantially the entire flow path 182 to map fluid velocities within the flow path 182. From this map of fluid velocities, various aspects of the flow path 182 may be evaluated, such as the maximum velocity of fluid in the flow path 182 or the pressure drop across portions of the flow path 182.

Employing the LDA test bench 160 in the execution of the process 150 is believed to yield valve designs that, relative to conventionally designed valves, have a shorter flow path for a given fluid flowed across a given pressure drop at a given flow rate without exceeding a given maximum acceptable rate erosion or a given noise maximum. The LDA test bench 160 validates predictions from CFD with empirical data, so the valve design can be adjusted based on actual flow conditions before the valve design is released to production.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a valve trim having a plurality of flow paths, wherein each flow path of the plurality of flow paths comprises:
an inlet;
an outlet;
a series of stages disposed between the inlet and the outlet; and
a plurality of expansion zones disposed in series with the series of stages between the inlet and the outlet, wherein each expansion zone of the plurality of expansion zones is disposed between a sequential set of adjacent upstream and downstream stages of the series of stages, wherein each expansion zone of the plurality of expansion zones is configured to flow a fluid in a direction that is generally transverse to directions of flow in both the adjacent upstream stage and the adjacent downstream stage, wherein each expansion zone of the plurality of expansion zones is sized larger than a first cross-sectional area of the adjacent upstream stage and a second cross-sectional area of the adjacent downstream stage, wherein each expansion zone of the plurality of expansion zones has a total height from a first end to a second end of the respective expansion zone, wherein the total height of each expansion zone of the plurality of expansion zones vertically overlaps with a first height of one of the adjacent upstream stage or the adjacent downstream stage and does not vertically overlap with a second height of a different one of the corresponding adjacent upstream stage or the adjacent downstream stage, wherein the total height, the first height, and the second height are measured perpendicular to the directions of flow, wherein the plurality of expansion zones progressively increase in size along each of the flow paths, and wherein at least one of the plurality of flow paths comprises stages in the series of stages with generally rectangular cross-sections that progressively increase in height.

2. The system of claim 1, wherein the total height of each expansion zone of the plurality of expansion zones and the second height of the different one of the corresponding adjacent upstream stage or the adjacent downstream stage are vertically stacked with one completely above the other.

3. The system of claim 1, wherein at least one flow path of the plurality of flow paths includes stages in the series of stages that progressively increase in size according to a non-constant increasing ratio.

4. The system of claim 1, wherein at least one stage of the series of stages defines a generally cuboid volume.

5. The system of claim 1, wherein at least one of the plurality of expansion zones defines a generally cylindrical volume.

6. The system of claim 1, wherein at least some adjacent upstream and downstream stages of the series of stages have respective first and second central longitudinal axes extending in respective first and second directions that form acute angles between each other.

7. The system of claim 1, wherein the valve trim has a generally tubular shape disposed about a central axis, the inlet comprises a radial inlet, and the outlet comprises a radial outlet.

8. The system of claim 1, wherein the valve trim has a generally tubular shape disposed about a central axis, and each stage of the series of stages extends parallel to a plane that is generally perpendicular to the central axis.

9. The system of claim 1, wherein the valve trim comprises a plurality of plates, and adjacent upstream and downstream stages of the series of stages are disposed in different plates of the plurality of plates.

10. The system of claim 1, comprising a choke valve having the valve trim.

11. The system of claim 10, comprising a mineral deposit, a well, a pressure vessel, a pipeline, a storage facility, a mineral processing facility, a refinery, a mineral extraction system, a christmas tree, or a combination thereof, coupled to the choke valve.

12. The system of claim 10, wherein the choke valve comprises:
a housing that defines an upstream manifold having the valve trim;
a valve member configured to translate through the valve trim and adjust a flow rate through the choke valve; and
an actuator configured to move the valve member.

13. The system of claim 1, wherein a pressure drop between each sequential set of adjacent upstream and downstream stages in the series of stages is less than 12%.

14. The system of claim 1, wherein the series of stages each define a generally cuboid volume and the plurality of expansion zones each define a generally cylindrical volume, wherein the total height of the generally cylindrical volume of each expansion zone of the plurality of expansion zones vertically overlaps with the first height of one of the generally cuboid volumes of the adjacent upstream stage or the adjacent downstream stage and does not vertically overlap with the second height of a different one of the generally cuboid volumes of the corresponding adjacent upstream stage or the adjacent downstream stage.

15. The system of claim 1, wherein the total height of an expansion zone of the plurality of expansion zones is less than another total height of the first and second heights of the adjacent upstream stage and the adjacent downstream stage of the series of stages.

16. The system of claim 15, wherein the total height is substantially equal to one of the first or second heights.

17. The system of claim 1, wherein the series of stages is arranged in alternating opposite directions relative to a direction from the inlet to the outlet of the respective flow path, and the plurality of expansion zones is arranged on alternating opposite sides with respect to the direction from the inlet to the outlet of the respective flow path.

18. The system of claim 17, wherein each stage of the series of stages has at least one flat side extending along the respective stage to define a stage flow path, and each expansion zone of the plurality of expansion zones has a curved side extending over the total height from the first end to the second end of the respective expansion zone to define an expansion flow path.

19. The system of claim 17, wherein the series of stages is arranged in the alternating opposite directions at acute angles to define a series of V-shaped paths, and each V-shaped path of the series of V-shaped paths has an expansion zone of the plurality of expansion zones disposed between the adjacent upstream stage and the adjacent downstream stage of the series of stages.

20. The system of claim 19, wherein the series of V-shaped paths defines a zigzagging path.

21. A system, comprising:
a valve trim having a plurality of flow paths, wherein each flow path of the plurality of flow paths comprises:
an inlet;
an outlet;
a series of stages between the inlet and the outlet, wherein each stage of the series of stages has at least one flat side extending along an axis of the respective stage to define a stage flow path; and
a plurality of expansion zones disposed in series with the series of stages between the inlet and the outlet, wherein each expansion zone of the plurality of expansion zones has a curved side extending along an axis of the respective expansion zone to define an expansion flow path, wherein each expansion zone of the plurality of expansion zones is disposed between a sequential set of adjacent upstream and downstream stages of the series of stages, wherein each expansion zone of the plurality of expansion zones is configured to flow a fluid in a direction that is generally transverse to directions of flow in both the adjacent upstream stage and the adjacent downstream stage, and wherein at least one of the plurality of flow paths comprises stages in the series of stages with generally rectangular cross-sections that progressively increase in height.

22. The system of claim 21, wherein the at least one flat side of each stage of the series of stages comprises a plurality of flat sides, and the curved side of each expansion zone of the plurality of expansion zones comprises an annular side.

23. A system, comprising:
a valve trim having a plurality of flow paths, wherein each flow path of the plurality of flow paths comprises:
a series of stages; and
a plurality of expansion zones disposed in series with the series of stages, wherein each expansion zone of the plurality of expansion zones is disposed between a sequential set of adjacent upstream and downstream stages of the series of stages, wherein each expansion zone of the plurality of expansion zones is configured to flow a fluid in a direction that is generally transverse to directions of flow in both the adjacent upstream stage and the adjacent downstream stage, wherein each expansion zone of the plurality of expansion zones is in line with one of the adjacent upstream stage or the adjacent downstream stage and offset from a different one of the corresponding adjacent upstream stage or the adjacent downstream stage, wherein at least one of the plurality of flow paths comprises stages in the series of stages with generally rectangular cross-sections that progressively increase in height.

* * * * *